(12) United States Patent
Lumbert

(10) Patent No.: US 7,449,107 B2
(45) Date of Patent: Nov. 11, 2008

(54) DEHYDRATION TOILET HAVING AN INFUSION ODOR CAPTURING STEAM AND WATER RECOVERY SYSTEM

(76) Inventor: Steven Lumbert, P.O. Box 1031, Cape Canaveral, FL (US) 32920

(*) Notice: Subject to any disclaimer, the term of this patent is extended or adjusted under 35 U.S.C. 154(b) by 63 days.

(21) Appl. No.: 11/382,336

(22) Filed: May 9, 2006

(65) Prior Publication Data
US 2006/0206996 A1 Sep. 21, 2006

Related U.S. Application Data

(63) Continuation-in-part of application No. 10/904,234, filed on Oct. 29, 2004, now Pat. No. 7,211,187.

(51) Int. Cl.
*C02F 1/04* (2006.01)
*C02F 1/78* (2006.01)

(52) U.S. Cl. .............. 210/153; 210/179; 210/180; 210/192; 210/205; 4/227.1; 4/317; 4/320; 4/322; 202/175; 202/185.2; 34/75; 34/179

(58) Field of Classification Search ............... 210/153, 210/178–180, 192, 205; 4/227.1, 313, 317, 4/318, 320, 322; 202/175, 185.2; 34/73–76, 34/179
See application file for complete search history.

(56) References Cited

U.S. PATENT DOCUMENTS 3,725,205 A * 4/1973 Heen .......................... 202/181
3,733,617 A * 5/1973 Bennett ....................... 4/315
3,868,731 A * 3/1975 Stahl et al. .................. 4/318
3,882,552 A * 5/1975 Turner ........................ 4/318
5,145,576 A * 9/1992 Lataillade .................. 210/180
5,293,696 A * 3/1994 Schmidt et al. ............. 34/76
5,698,095 A * 12/1997 Kami ........................ 210/173
6,101,638 A 8/2000 Hammond
6,496,988 B1 12/2002 Hammond

FOREIGN PATENT DOCUMENTS

JP 02027030 A * 1/1990

* cited by examiner

*Primary Examiner*—Matthew O Savage
(74) *Attorney, Agent, or Firm*—Malin Haley DiMaggio Bowen & Lhota, P.A.

(57) ABSTRACT

A self-contained dehydration toilet having an odor-capturing steam and water recovery system. The dehydration toilet comprises a toilet bowl, a dehydration engine connected to the toilet bowl, a steam, gas and vapor conduit from the dehydrating engine, a water supply infusion tank which receives steam, gases and vapor from the dehydration engine to the infusion water tank, an ozone generator which supplies ozone to the water supply, a vacuum pump connected to the infusion water tank, and a power source supplying power to the dehydrating engine, the ozone generator, a control circuit and the vacuum pump. The dehydrating engine has a heating device and helical paddles to aid in the dehydration process. The dehydrating toilet reuses steam and captures odors and vapors with diffusion chambers in the infusion water tank.

3 Claims, 7 Drawing Sheets

DEHYDRATION TOILET HAVING AN INFUSION ODOR CAPTURING STEAM AND WATER RECOVERY SYSTEM

BACKGROUND OF THE INVENTION

1. Field of the Invention

A mobile or stationary modular, self-contained dehydration toilet that reduces the human waste to a sanitized powder and reduces odors by recovering steam and undesirable waste gases and vapors from the dehydration engine and mixing the steam, gases and vapors with ozone into the system water reservoir by diffusion. The dehydration toilet includes an infusion tank that is used to treat gray water rendering said gray water useful for secondary purposes.

2. Description of Related Art

In industrialized countries, each toilet flush uses between four to seven gallons of water except where 1.6 gallon flush toilets have been mandated. On average, a typical household uses over forty thousand gallons of water each year just to flush its toilets. Lakes and oceans are being inundated with large volumes of partially and, sometimes, not treated human waste that has polluted many areas of the world. Even municipal sewage systems maintained in large metropolitan areas, with some form of sewage treatment, produce large volumes of undesirable waste products that enter into surrounding lakes, oceans and streams. In addition, other water pollution is caused from boats and ships that typically discharge untreated waste into the water environment.

The present invention overcomes problems found in the prior art by providing a portable, self-contained evaporation toilet that can dehydrate human waste, reduce the amount of water necessary to flush and reduce odor emission from the toilet system, then puts the sanitized powder into a vacuum cleaner type bag or central vacuum system.

SUMMARY OF THE INVENTION

A portable, self-contained toilet for removal of human waste that includes a dehydration engine, a toilet bowl, a vacuum motor, a toilet seat connected to the toilet bowl and a toilet lid connected to the toilet seat and toilet bowl. The toilet bowl includes one or more nozzles for injecting water on the bowl surface for flushing purposes.

The toilet includes a water tank that supplies and recovers water that is connected to the toilet bowl to provide flushing water to the toilet bowl and capture of odors from the recovery of steam and undesirable gases and vapors.

The waste dehydration engine is connected to the outlet of the toilet bowl through a flush valve that can be electrically operated or manually operated for flushing the waste into the dehydration engine and sealing the dehydration engine compartment once the waste is transferred.

The dehydration engine includes heating units for raising the temperature of the solid and liquid waste contained therein above 212 degrees Fahrenheit to evaporate waste and reduce pathogens. Rotatable paddles with the dehydration engine are employed for mixing and grinding the waste mixture. The paddles are rotated by an electric motor connected to each of the paddles in the dehydration engine.

The dehydration engine converts (with heat) the liquid waste and water into gases vapors and steam while reducing the solid waste products to a dry powder.

A vacuum motor and conduit are connected in fluid communication with the dehydration engine through a check valve. By creating lower air pressure, the vacuum pump removes dried powdered waste from the dehydration engine, depending on the positioning of the check valve.

The dehydration engine has an inlet conduit connected to the vacuum pump with the check valve between the dehydration engine and the vacuum pump. The vacuum pump has an output to a collector, such as a bag, for withdrawing the powdered dehydrated solid waste from the dehydration engine into the bag for disposal.

The system also includes a steam pump that removes steam and undesirable gases and odorous vapors from the dehydration engine, adds ozone ($O_3$) and mixes water from the water reservoir tank with the steam, gases and vapors and transfers the mixture back to the water tank to remove odors and reuse as water. The steam pump is in fluid communication with the water tank through a check valve. The ozone generator is connected to the supply line from the water tank to the steam pump. A separate return conduit provides water, gases, vapor and steam flow from the steam pump back to the water tank.

The operation of the toilet is discussed below. The water supply for the toilet bowl can be received from a self-contained reservoir tank for an individual unit, from a remote gray water tank servicing several toilets or from a domestic municipal water supply.

The flush valve positioned between the toilet bowl and the entrance to the dehydration engine opens by an electric motor when a button is pushed or when the toilet lid is closed. If there were no electricity available, the flush valve can be manually opened with a foot pedal or with a battery back up supply.

Water jets direct water in the flush bowl to direct the waste into the dehydration engine. The flush valve is then closed and the dehydration engine compartment is sealed. After a predetermined number of flushes, the paddle electric motors will rotate the paddles for mixing and stirring and, at the same time, the electric heating elements inside the dehydration are turned on to heat the mixture above 212 degrees Fahrenheit. When the liquid materials have evaporated to create steam, gases and vapor, the steam pump turns on and the check valve is opened to the dehydration engine compartment. The steam pump draws steam, gases, vapor and odors out of the dehydration engine into a water line for recovery. This process continues until all the gaseous moisture is removed from the dehydration engine.

The steam, gases and vapors that are removed from the dehydration engine by the steam pump also receives input water from the water supply that has been mixed with ozone. The ozone and water mix with the steam, gases and vapors, all of which is returned to the water tank. This process removes odors from the dehydration engine, putting steam, gases and vapor into solution in the water and with the ozone, basically eliminating most of the odor generated by the dehydration engine and sanitizing the liquid.

Once the solid waste has been sufficiently dried inside the dehydration engine by the heating elements, the steam pump turns off and the vacuum pump turns on, the check valve opens to the vacuum pump which removes the dry waste from the dehydration engine compartment and places the dry powdered waste in a bag for disposal. As an alternative, the toilet can be connected to a central vacuum system.

The system can operate with a plurality of individual toilets, each of which is connected to a gray water supply.

A safety switch can be used to stop all the motors and heaters if the toilet lid is in an open position.

Ozone is introduced into the steam, gases and vapor exhaust and water supply in order to help eliminate odors that may be in the steam and other undesirable gases and vapors generated by the heaters in the dehydration engine.

In an alternate embodiment of the toilet, the reservoir water tank will include one or more gaseous diffusers and a gaseous diffusion chamber forming an infusion tank that allows steam, undesirable gases and vapors, especially odors to be directly diffused into the water in the water tank and infused directly into the water thereby eliminating the odor from the resulting gases directly into the water tank reservoir. The diffusion chamber can also be used to treat gray water.

It is an object of this invention to provide an improved self-contained toilet and method for efficiently treating and disposing of human waste using the least amount of water and reducing odors around the toilet system while providing recovery water that is used back to the water supply tank.

Another object of this invention is to provide a portable dehydration engine for a toilet that can successfully treat human waste efficiently and remove odors and can be incorporated into a single self-contained toilet or a multiple toilet system, all of which is either mobile or stationary and useful for residential, commercial or industrial application and also in mobile environments, such as boats, ships, aircraft and land vehicles.

In accordance with these and other objects which will become apparent hereinafter, the instant invention will now be described with particular reference to the accompanying drawings.

DETAILED DESCRIPTION

Figure 1:
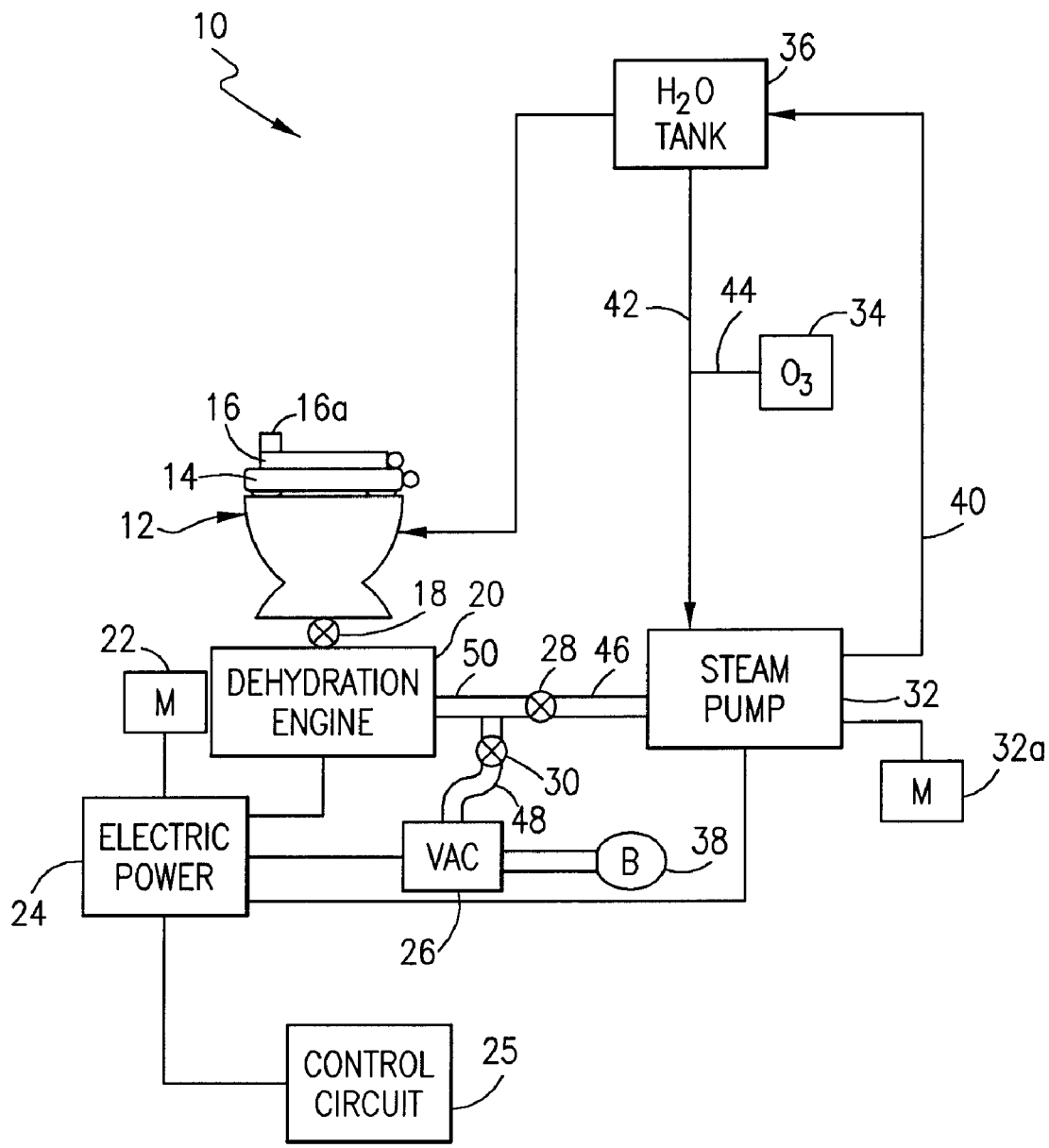
FIG. 1 shows a schematic block diagram of the present invention for the self-contained mobile or stationary dehydration toilet using the dehydration engine.

Referring now to the drawings and, in particular, FIG. 1, the present invention is shown schematically at 10 including a toilet bowl 12 having a toilet seat 14 and a toilet lid 16 with a switch 16a that indicates the toilet lid is closed properly.

The toilet bowl 12 receives water from water reservoir tank 36 which could be a separate tank for each toilet, a gray water supply from a large reservoir serving several individual toilets or a municipal water supply into a holding tank.

One of the important elements of the invention is the dehydration engine 20 which includes at least one heating element that can heat the liquid and solid waste material deposited therein to above 212 degrees Fahrenheit including the liquids disposed therein. The dehydration engine 20 also includes one or more paddles that can be rotated within cylinders for grinding the waste material inside the engine 20. An electric motor 22 is used to drive the paddles (FIG. 4) and is connected to an electric power source 24 which could be a battery or a conventional electrical supply. The electrical power source 24 is also connected to the dehydration engine 20 and the heat elements contained therein for electrical heating.

A sealable flush valve 18 connects the output of the toilet bowl 12 to the inlet of the dehydration engine 20. Flush valve 18 is normally closed except when flushing waste out of the toilet bowl in conjunction with some water from tank 36 and spray jets inside the toilet bowl to help move the waste materials through the open valve 18 into the dehydration engine 20. Once the flushing process is finished, valve 18 remains sealed and closed. The dehydration engine compartment is sealed airtight. Flush valve 18 is electrically actuated; however, if there is a power failure, the valve 18 can be opened with battery power or a mechanical opener is provided that can be foot actuated.

The system includes a steam pump 32 connected by conduits 46 and 50 to the dehydration engine through a check valve 28. The steam pump 32 with the check valve 28 open and valve 30 closed draws steam, moisture, gases and vapor out of the dehydration engine 20 where the steam, gases and vapors mix (in the steam pump) with water from the tank 36 that also includes ozone from an ozone generator 34 connected to the water conduit 42 between the tank 36 and the steam pump 32. A return conduit 40 from steam pump 32 pumps water, steam, vapors and ozone that is combined in the steam pump including contaminated gases and odors from the dehydration engine 20 and other vapors into solution where the liquid gaseous mixture is pumped back into the holding tank 36 through return conduit 40 eliminating odors. The steam condenses and the undesirable gases and vapors are trapped in solution in the tank water.

A vacuum pump 26 is also provided through conduit 48 to the dehydration engine and conduit 50 through a valve 30. With valve 28 closed and valve 30 open, at the end of the dehydration process, after the solid waste materials have been reduced to a powder and the steam and vapor have also already been removed from the dehydration engine compartment, vacuum pump 26 will draw the powder-like waste material from the dehydration engine 20 through the vacuum pump to a bag 38 where the powdered waste can be disposed of.

FIG. 1 shows a control circuit 25 that includes software and hardware that is connected to the electrical power and motor 22 for the dehydration engine, the flush valve 18, valves 28 and 30, the vacuum pump 26 and steam pump and motor 32 and 32a. The control circuit is used to automatically provide timing to the heating elements located in the dehydration engine 20 for proper opening and closure and for the valves in the turning on and off of electrical equipment to conserve energy especially if the system uses a battery.

The dehydration engine 20 may be cycled to operate after a certain number of flushes depending on the amount of waste material put into the dehydration engine. When the dehydration engine 20 is activated and flush valve 18 is sealed and closed, the heating elements inside the dehydration engine 20 are turned on to heat the waste material above 212 degrees Fahrenheit while, at the same time, the paddle blades are rotated, grinding the solid waste material in cylinders within the dehydration engine 20. At some point in the process, valve 28 is opened and the steam pump draws steam, gases, liquid, water, moisture and vapor out of the dehydration engine combining the exhaust materials with water from conduit 42 in tank 36 and pumping the combined materials back to tank 36 through conduit 40 which is a return line to tank 36. After the steam, gases and vapor have been removed from the dehydration engine during the process, valve 28 will close and valve 30 will open allowing the dried powder residue to be drawn out of the dehydration engine into bag 38.

The entire dehydration process is controlled by a control circuit 25 that is mounted on a circuit board that is programmed to control temperatures, count flushes, turn motors on and off, control water flow and also control the dump valves, flush valves and safety switches.

It should be noted that water from the reservoir tank 36 that was used to flush the toilet in bowl 12 is being recaptured in the dehydration engine, turned into steam along with gases and vapors (including odors from the waste material), all of which are put into solution in the water in the steam pump 32 and returned to the holding tank 36. The odors are trapped in the water in the tank 36.

The method of the invention includes providing water to the toilet for cleaning the toilet bowl that can come from a self-contained tank, from a remote gray water tank or from the domestic water supply, all of which is returned to a water tank.

The flush valve 18 between the flush bowl and the dehydration engine includes a ball valve assembly that can open with a manual foot pedal if the electric power is off. The ball valve can also be opened by an electric motor when a button is pushed or when the toilet lid is closed. Specifically, the ball valve 18 has a seal.

As waste material goes into the dehydration engine at a certain time after a predetermined number of flushes, the paddle motor turns on and begins to stir, the electric heating elements turn on to raise the temperatures above 212 degrees Fahrenheit and the steam pump turns on in order to draw the steam, gases and vapors out of the dehydration engine. The steam, gases and vapor is mixed with water from the water tank at the steam pump. The water also contains ozone. The steam, gases and vapors are captured by the water and returned to the tank 36.

Once the residue powdered waste is dried, the steam pump turns off and the vacuum pump turns on which draws powdered waste into a bag for disposal.

Figure 2:
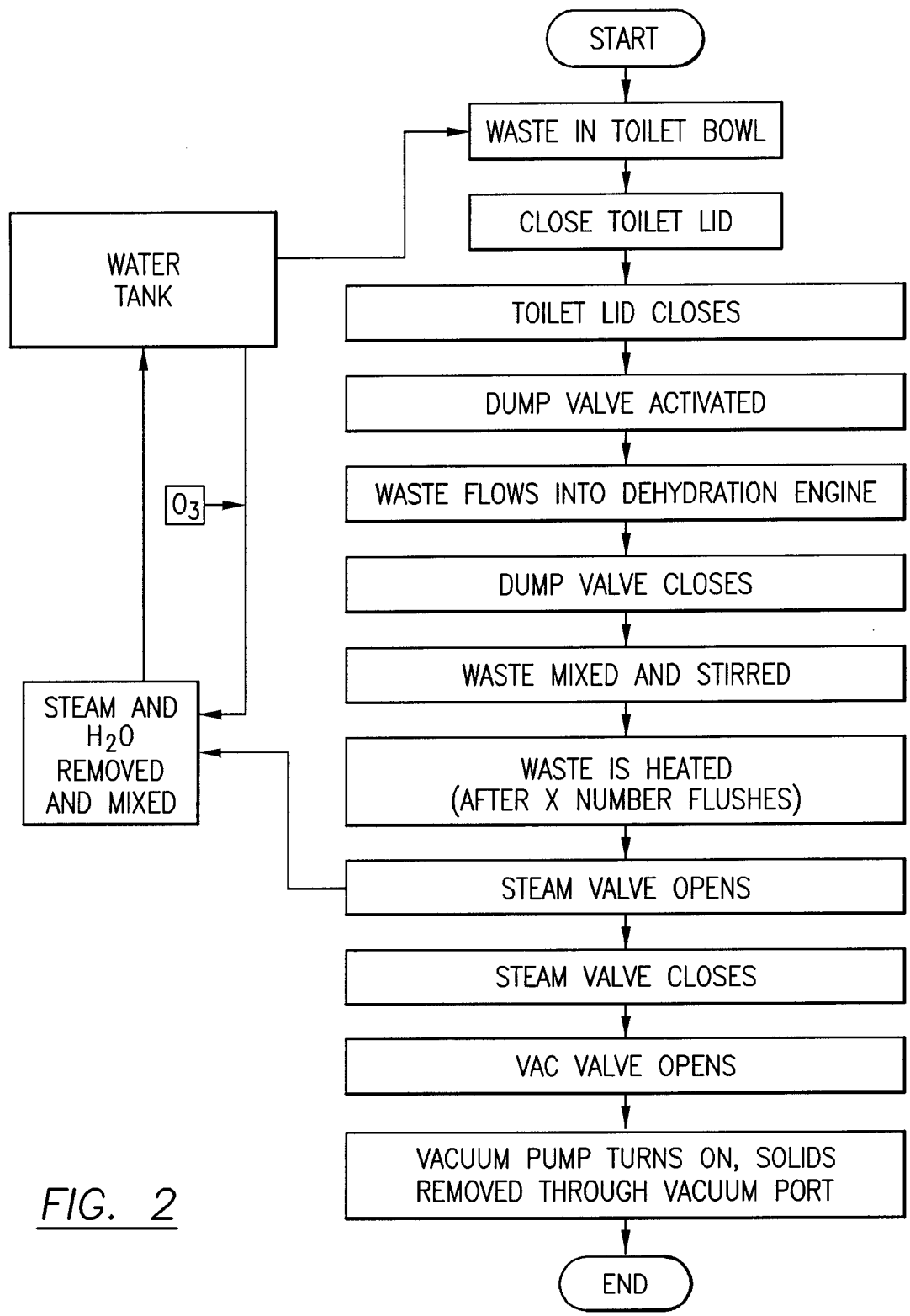
FIG. 2 shows a flow chart of the operation and method of the dehydration engine and toilet system in accordance with the present invention.

Referring now to FIG. 2, the overall process is shown beginning with waste in the toilet bowl. Once the toilet lid is closed, the dump valve is activated that opens the toilet bowl into the dehydration engine so that waste flows into the dehydration engine. The dump valve then closes and seals. The waste is mixed and stirred by the paddles and the electric motor. The waste is also heated after x-number of flushes to above 212 degrees Fahrenheit. At some point, the steam valve opens that allows steam and water to be removed from the dehydration engine where it is mixed with water from the water tank and ozone and put back into solution thereby removing odors and preventing them from escaping. When that process is finished, the steam valve closes. At some point, the vacuum valve opens when the materials and residue have been reduced to a powder. The vacuum pump turns on and the solids are removed through the vacuum port into a bag for disposal.

Figure 3:
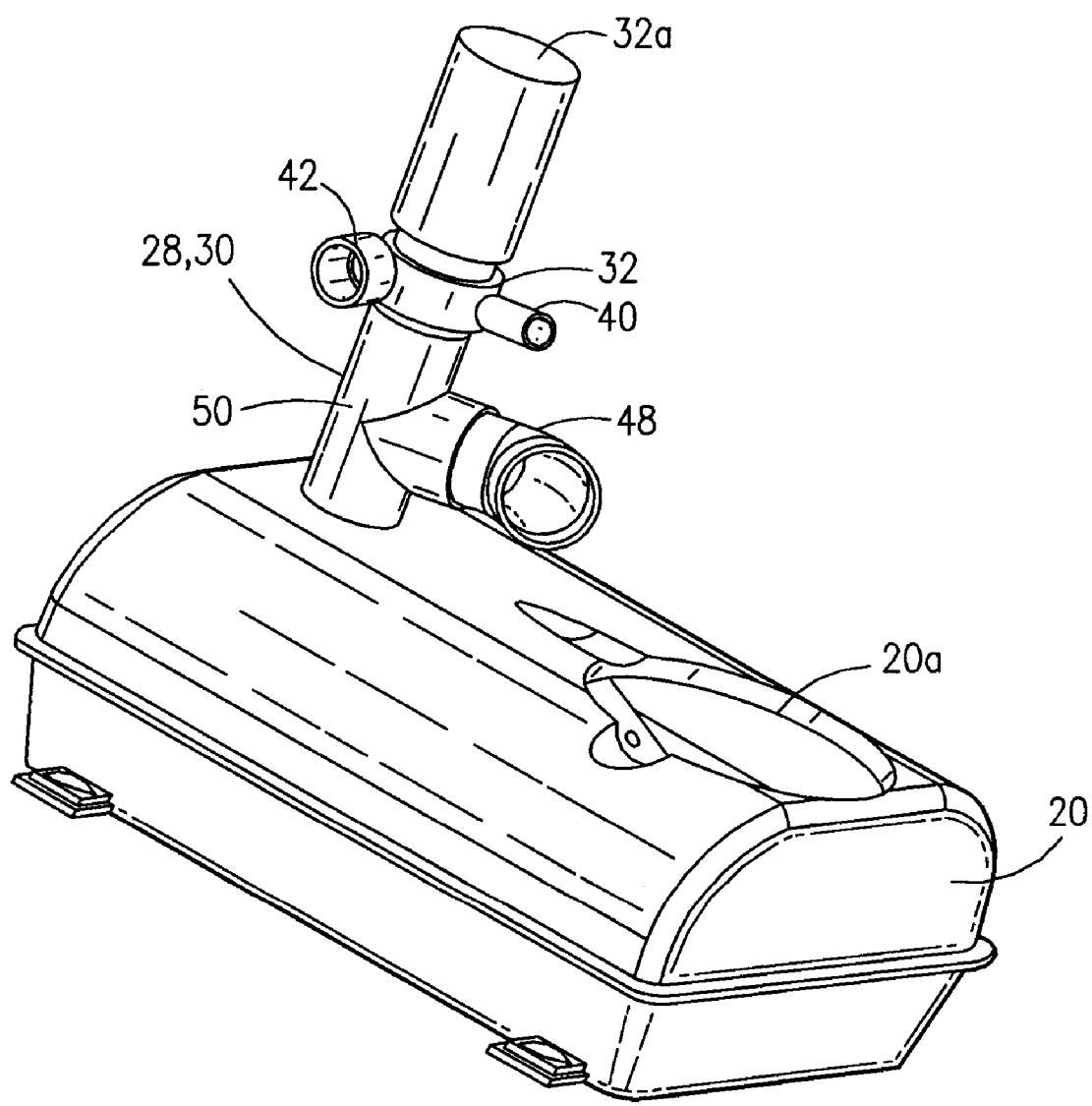
FIG. 3 shows a perspective view of the toilet system including the dehydration engine with the cabinet removed.

Referring now to the drawings and, especially, FIG. 3, the dehydration engine 20 is shown separated from the toilet bowl which connects to the bowl flush valve through aperture 20a and to the toilet bowl. The steam pump 32 is shown connected by conduit 50 to the dehydration engine and includes a pump motor 32a that rotates the pump. Inside the steam pump 32, water is brought in from the water reservoir tank 36 through conduit 42 which mixes with the steam, gases and vapor coming from conduit 50 when the steam valve 28 is opened allowing the water containing the mixture of steam, gases and water (including ozone from an ozone generator 34 [FIG. 1]) into conduit 40 which is returned to the water tank 36.

Conduit 50 connected to the dehydration engine is connected to conduit 48 that goes to a vacuum pump to draw the dry residue out of the dehydration engine when the dried residue waste material has been dehydrated and is ready to be pumped into a bag for disposal.

Figure 4:
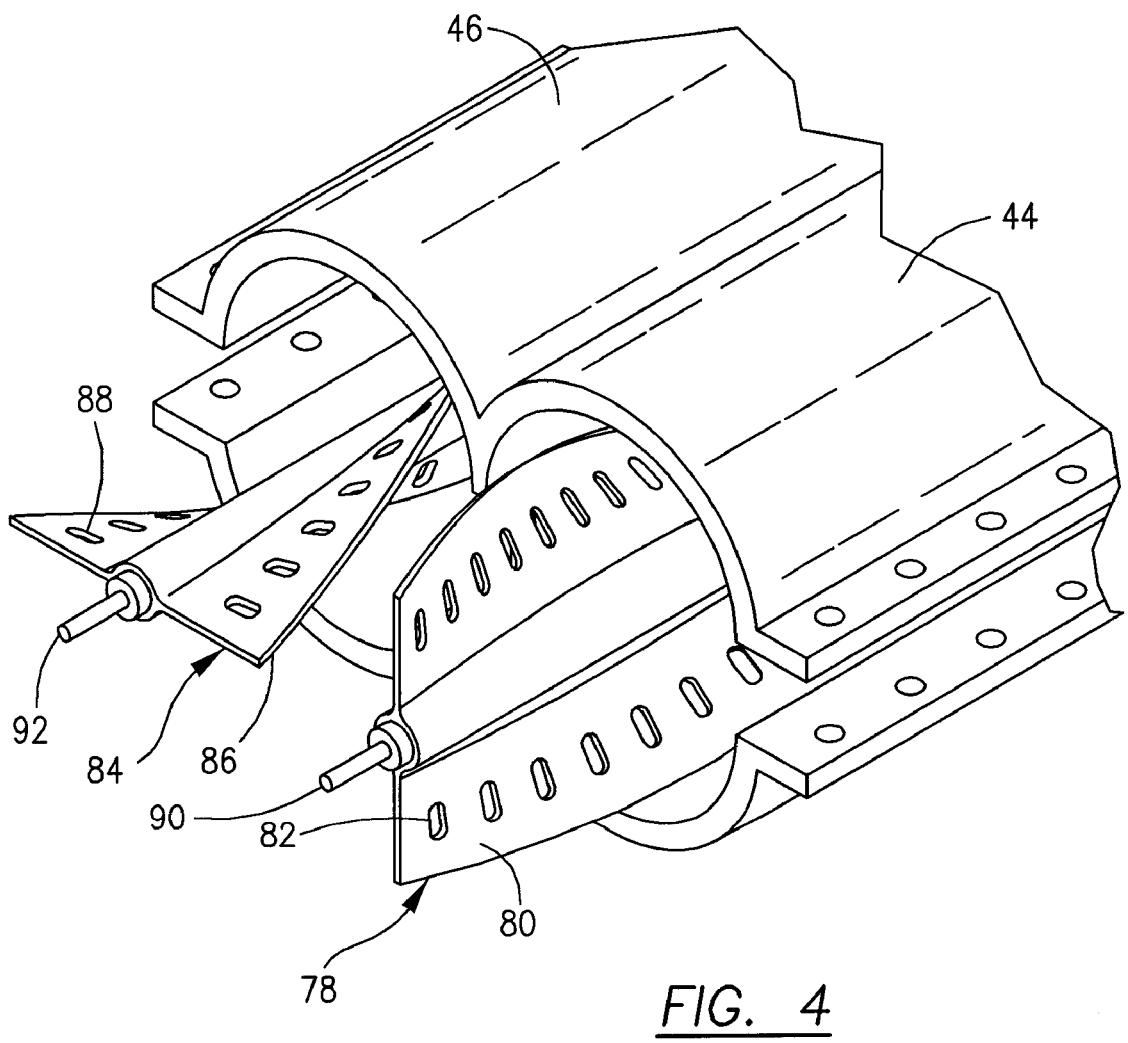
FIG. 4 shows a perspective view of the cylinders used in the dehydration engine in phantom with the helical blades.

Referring to FIG. 4, inside each cylindrical chamber 44 and 46 are helix blades 78 and 84, which are longitudinally disposed within said cylinders 44 and 46. The helix blades 78 and 84 are connected to a motor 22 that provides rotation of the helix blades, moving them in a first direction and then a second direction. The purpose of the blades or paddles is to separate solid materials from the liquids to expedite evaporation through heating of conductive heating elements, macerate the waste, clean the sides and aid in the evacuation of waste. A series of elongated heating elements are mounted around the periphery of both of the cylinders 44 and 46 and at predetermined times are activated by a controller that controls the motor and heating outlets that are connected to each of the heating elements on the chamber outside walls. Using a control program in control circuit 25 (FIG. 1), the electric power provided to the heating elements is controlled after a sequence of flushes for efficiency. To preserve battery energy, based on temperature sensing in order to provide the most efficient boiling or heating of the liquids for evaporation purposes, the control circuit 25 is programmed.

Figure 5:
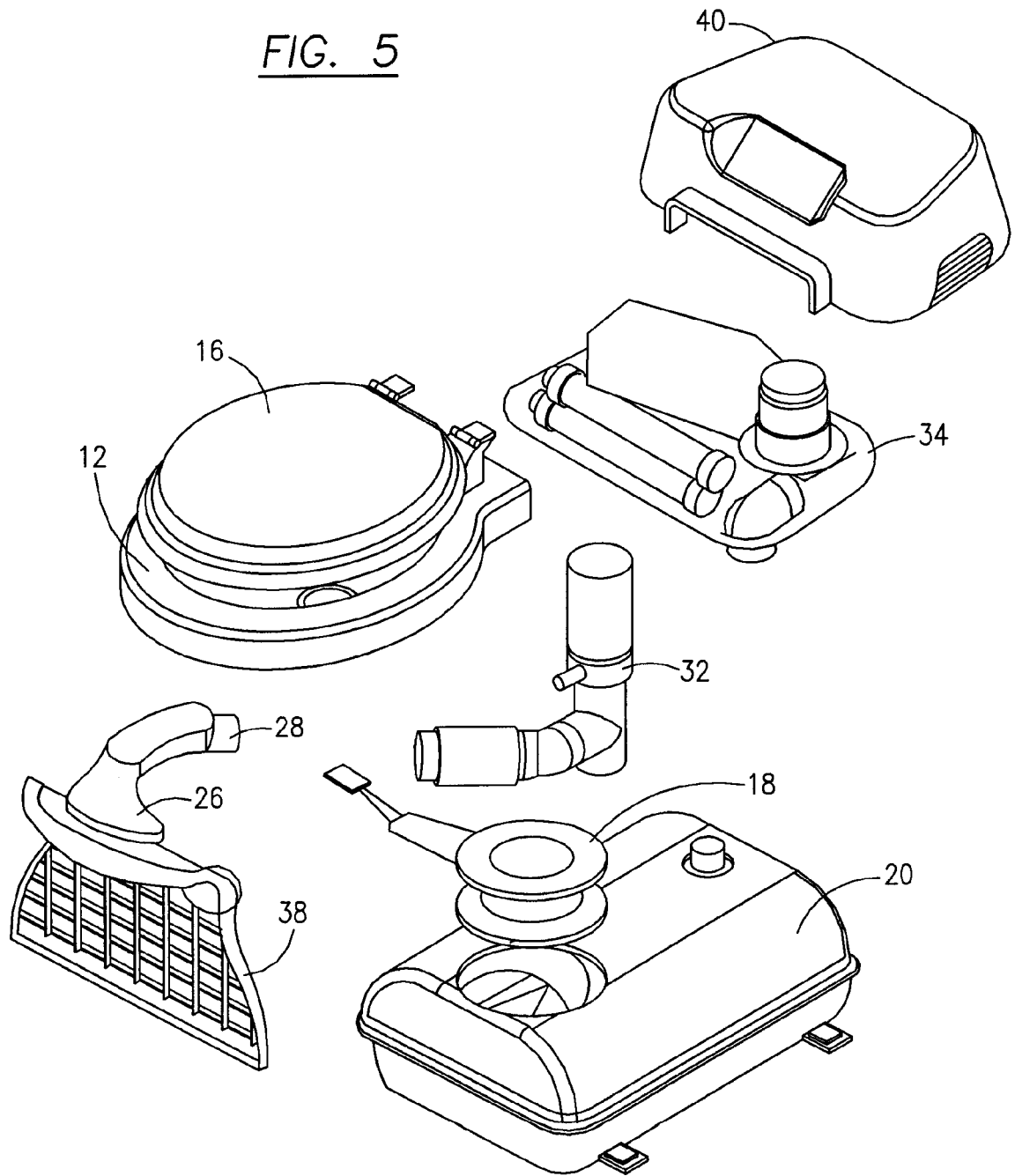
FIG. 5 shows an exploded view of the toilet system in accordance with the present invention.

Referring to FIG. 5, an exploded view of the present invention is shown with the individual parts in their separate capacities. The toilet bowl 12 and toilet lid 16 are separated from the dehydration engine 20 by the sealable flush valve 18. The vacuum motor 26 removes dried residue through the check valve 28 and deposits the powder into a vacuum bag 38. The water pump 32 provides the supply of water and ozone from the ozone generator 34 to the captured contaminated steam, gases and vapor trapped in the return water which is then reused. A cover 40 is provided for the ozone generator.

Figure 6:
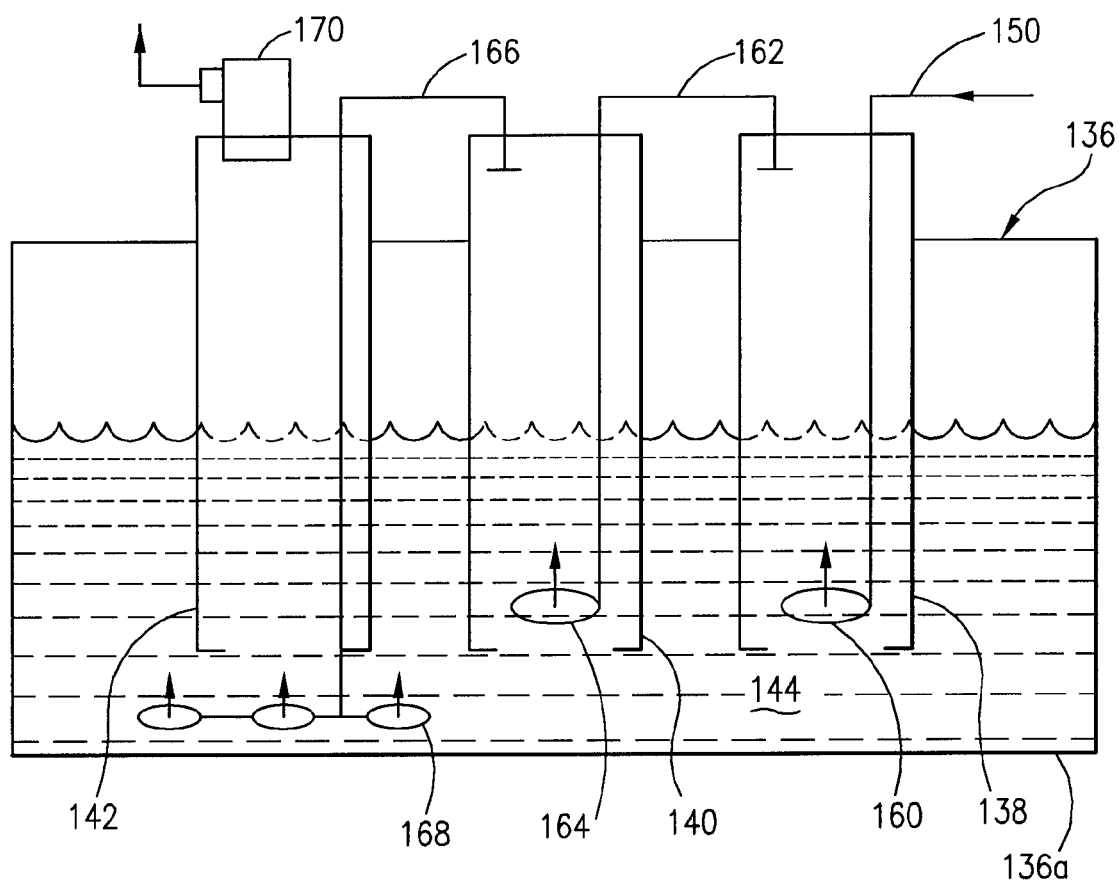
FIG. 6 is a schematic diagram of an alternate embodiment of the invention showing the odor and contaminant removal infusion device used with the toilet.
Figure 7:
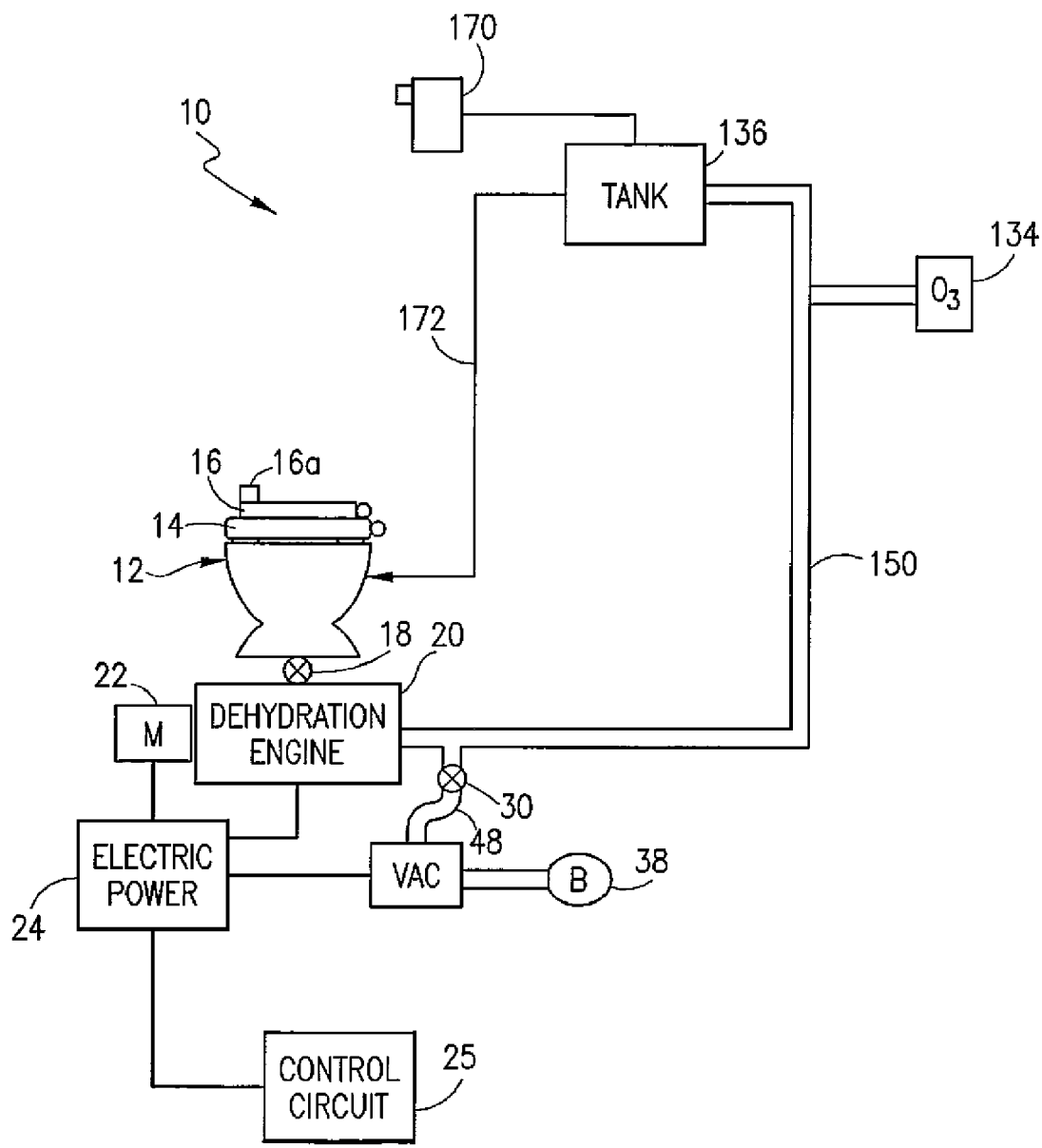
FIG. 7 shows a schematic block diagram of an alternate embodiment of the invention.

Referring now to FIGS. 6 and 7, an alternate embodiment of the invention is disclosed. FIG. 6 shows a schematic diagram of a water holding tank in the alternate embodiment. One of the functions of the holding tank 136 is to remove airborne contaminants, especially odors and other undesirable contaminants, from the exhaust waste materials that are discharged from the dehydration engine which includes steam, vapor and gases that result from the high temperatures (above 212° Fahrenheit) that the waste materials experience in the dehydration engine. Water sprayed in the flush bowl that ends up in the dehydration tank and moisture in the waste materials that is discharged under lower pressure from the dehydration engine directly into the water holding tank results in steam, gases and vapors. The water holding tank 136 as shown in FIG. 6 includes a closed water storage tank housing 136a that contains individual infusion chambers 138, 140 and 142 that are closed at the top and hermetically sealed and are open in the bottom. Each chamber is partially submerged in the water 144 (or other liquid) that is disposed in the storage tank. Each infusion chamber contains a gas diffuser near the base of the chamber that is connected to the conduit 150 having the output of vapor, steam and gases coming from the dehydration engine as an input into the first stage gas infuser 160. The gas diffuser 160 has numerous small holes to emit gas into the water as bubbles. The gas bubbles rise to the top of the water 144 and are dispersed into the space above the water in each infusion chamber 138, 140, and 142. Each of the chambers has an upper closed portion that is also subjected to a lower gas pressure because of the vacuum exhaust pump 170 disposed at the top of the third air defusing chamber 142 which has an outlet to atmospheric or the ambient air.

The purpose of each of the infusion chambers within the supply tank 136 is to provide air diffusion of the steam and gases in order to remove odors and contaminants from the gaseous materials exiting the dehydration engine. Due to the lower than atmospheric pressure caused by the vacuum pump 170, the third chamber 142 which has a local diffuser 168 that connects back to the second chamber 140. Diffuser 164 receives gases from the first chamber 138. Steam condenses in the diffuser and mixes with the water in tank 136. Odors and contaminants are infused into the water in the tank by the diffusers 160, 164 and 168. Ozone aids in odor reduction and water purification.

The plurality of diffusers 160, 164 and 168 disposed in the first, second and third infusion chambers defuse undesirable contaminants in the gases into the water in holding tank 136.

Referring now to FIG. 7, the water tank is represented by tank 136 that is connected directly to the dehydration engine 20 and an ozone generator 134. The tank 136 is represented by the tank and air diffuser system shown in FIG. 6.

The water tank 136 can include an overflow in case too much water is generated based on the steam removal from the dehydration engine. Another source of water for the tank 136 could be a municipal water supply or a ground water system that uses grey water from shower water and other water that is desired to be processed for reuse. The water tank 136 also has an outlet conduit 172 that is connected to the toilet bowl 12 that includes a valve and a solenoid for providing flush water to the toilet bowl 12. Using the alternate embodiment shown in FIGS. 6 and 7, the vacuum pump 170 creates lower pressure in tank 136 to draw the gases and steam from the dehydration engine for infusion in tank 136 and to discharge non-odorous air and gases to ambient air. Odors and other contaminants generated in the dehydration engine are eliminated. Different liquids could be used in tank 136 to infuse other gases generated in different hazardous environments.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A self-contained dehydration toilet having an infusion odor capturing steam and water recovery system comprising:
    a toilet bowl having an outlet passage;
    a human waste dehydration engine connected to the toilet bowl outlet passage;
    a water infusion supply tank having supply water and having a first outlet conduit connected to said toilet bowl for providing flush water to said toilet bowl;
    said infusion water supply tank also including at least one infusion chamber disposed in said water supply tank, said infusion chamber closed at the top and open at the bottom, said chamber bottom submerged in said supply water;
    a first steam and gas diffuser mounted in said infusion water tank in said first chamber and submerged in the supply water in said supply tank, said steam and gas diffuser having a first diffuser conduit connected to said dehydration engine for receiving steam and gases from said dehydration engine;
    a vacuum pump connected to and in fluid communication with said first diffusion chamber for receiving diffused steam and gases in the upper closed part of said chamber for directing said gases in said upper chamber above the water fluid line to ambient atmosphere; and
    a power source supplying power to the dehydration engine and the vacuum pump.

2. A dehydration toilet as in claim 1 including:
    a second diffusion chamber mounted in said infusion water supply tank, said second diffusion chamber having a closed top and an open bottom;
    a second steam and gas diffuser mounted in a lower portion of said second diffusion chamber for defusing gas and steam, said second diffuser submerged in said supply water and having a second fluid conduit connected to an inside portion of the upper first chamber for receiving diffused gases from said first chamber and defusing said gases in said second chamber, said vacuum pump being connected in fluid communication with an inside upper portion of said second chamber whereby gases are received from said dehydration engine are diffused in said first chamber and then transferred to said second chamber where said gases are diffused again and then vented to the atmosphere through said vacuum pump.

3. A self-contained dehydration toilet as in claim 1 including:
    an ozone generator connected to the first diffuser conduit from the dehydration engine to the infusion water tank for supplying ozone to the steam and gas mixture to be diffused in the infusion tank.

* * * * *